US012767676B2

(12) United States Patent
Hasegawa et al.

(10) Patent No.: US 12,767,676 B2
(45) Date of Patent: Oct. 20, 2026

(54) METHOD FOR PRODUCING DIPHOSPHINE MONOXIDE

(71) Applicant: TAKASAGO INTERNATIONAL CORPORATION, Tokyo (JP)

(72) Inventors: Junichi Hasegawa, Kanagawa (JP); Takashi Miyagawa, Kanagawa (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 502 days.

(21) Appl. No.: 18/494,112

(22) Filed: Oct. 25, 2023

(65) Prior Publication Data

US 2024/0158424 A1 May 16, 2024

(30) Foreign Application Priority Data

Oct. 31, 2022 (JP) ................................ 2022-174440

(51) Int. Cl.
*C07F 9/53* (2006.01)

(52) U.S. Cl.
CPC .................................. *C07F 9/5329* (2013.01)

(58) Field of Classification Search
CPC ..................................................... C07F 9/5329
See application file for complete search history.

(56) References Cited

U.S. PATENT DOCUMENTS

| | | | |
|---|---|---|---|
| 4,400,548 | A | 8/1983 | Abatjoglou et al. |
| 4,429,161 | A | 1/1984 | Abatjoglou et al. |
| 4,670,570 | A | 6/1987 | Wegman et al. |
| 5,919,984 | A | 7/1999 | Grushin |

OTHER PUBLICATIONS 1,2-Dichloroethane PubChem page (NTP) (Year: 1992).*

Chem. Rev. 2004, 104, 1629-1662 (Grushin-2) (Year: 2004).*

Wegman et al., "Carbonylation of Methanol at Unusually Low Temperature and Pressure with cis-$RhCl(CO)_2Ph_2P(CH_2)_2P(O)Ph_2$," J. Chem. Soc., Chem. Commun., pp. 1891-1892, 1987.

Hu et al., "Highly active catalysts of bisphosphine oxides for asymmetric Heck reaction," Royal Society of Chemistry, ChemComm, vol. 49, pp. 9425-9427, 2013.

Woste et al., "BINAP versus BINAP(O) in Asymmetric Intermolecular Mizoroki-Heck Reactions: Substantial Effects on Selectivities," Chemistry A European Journal, vol. 17, pp. 11914-11918, 2011.

Kawato et al., "Highly Enantioselective Bromocyclization of Allylic Amides with a P/P=O Double-Site Lewis Base Catalyst," Chemistry A European Journal, vol. 22, pp. 2127-2133, 2016.

Grushin, "Catalysis for Catalysis: Synthesis of Mixed Phosphine-Phosphine Oxide Ligands via Highly Selective, Pd-Catalyzed Monooxidation of Bidentate Phosphines," Journal of the American Chemical Society, vol. 121, No. 24, pp. 5831-5832, 1999.

Nguyen et al., "Intermolecular Palladium(0)-Catalyzed Atropo-enantioselective C—H Arylation of Heteroarenes," Journal of the American Chemical Society, vol. 142, pp. 2161-2167, 2020.

* cited by examiner

*Primary Examiner* — Amy C Bonaparte
*Assistant Examiner* — Derek Rhoades
(74) *Attorney, Agent, or Firm* — Sughrue Mion, PLLC

(57) ABSTRACT

A method for producing a diphosphine monoxide represented by a general formula (2), including: allowing a diphosphine represented by a general formula (1) to react with water in the presence of a metal catalyst, an oxidizing agent, and a base to selectively oxidize the diphosphine. In the general formulas (1) and (2), $R^1$, $R^2$, $R^3$, $R^4$, and Y are the same as defined in the description.

(1)

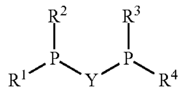

(2)

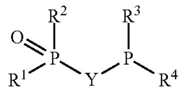

13 Claims, No Drawings

METHOD FOR PRODUCING DIPHOSPHINE MONOXIDE

CROSS-REFERENCE TO RELATED APPLICATIONS

This application is based on and claims priority under 35 USC 119 from Japanese Patent Application No. 2022-174440 filed on Oct. 31, 2022, the entire content of which is incorporated herein by reference.

TECHNICAL FIELD

The present invention relates to a method for selectively oxidizing a tertiary diphosphine to a diphosphine monoxide.

BACKGROUND ART

A diphosphine monoxide is useful as a ligand for a metal catalyst in reactions such as carbonylation, hydrogenation, hydroformylation, and coupling (Patent Literatures 1 and 2, and Non Patent Literatures 1, 2 and 3).

Examples of a method for producing a diphosphine monoxide from a tertiary diphosphine include a method of deriving a monophosphonium salt by selective monoalkylation, followed by alkali hydrolysis (Patent Literature 3), a method of monoselectively protecting by borane, followed by an oxidation reaction with hydrogen peroxide, followed by a removal of borane with an organic base (Non Patent Literature 4), and a method of allowing a tertiary diphosphine to react with an aqueous sodium hydroxide solution in the presence of a palladium catalyst and 1,2-dibromoethane (Non Patent Literatures 5 and 6).

CITATION LIST

Patent Literature

Patent Literature 1: U.S. Pat. No. 4,400,548 A
Patent Literature 2: U.S. Pat. No. 4,670,570 A
Patent Literature 3: U.S. Pat. No. 4,429,161 A
Patent Literature 4: U.S. Pat. No. 5,919,984 A

Non Patent Literature

Non Patent Literature 1: J. Chem. Soc. Chem. Commun., 1987, 1891-1892
Non Patent Literature 2: Chem. Commun., 2013, 49, 9425-9427
Non Patent Literature 3: Chem. Eur. J., 2011, 17, 11914-11918
Non Patent Literature 4: Chem. Eur. J., 2016, 22, 2127-2133
Non Patent Literature 5: J. Am. Chem. Soc., 1999, 121, 5831-5832
Non Patent Literature 6: J. Am. Chem. Soc., 2020, 142, 2161-2167

SUMMARY OF INVENTION

Technical Problem

The methods in Patent Literature 3 and Non Patent Literature 4 are multi-step reactions. Therefore, isolation of intermediates and post-treatment steps are complicated, and many wastes are generated in a hydrolysis step or a deprotection step.

In addition, the methods in Patent Literature 4 and Non Patent Literatures 5 and 6 are methods in which the target product can be obtained in one step, but an expensive palladium catalyst is used, and depending on the type of diphosphine, it may be necessary to use 1 equivalent or more of the palladium catalyst.

Solution to Problem

As a result of studies conducted by the present inventors in order to solve the above problems, it has been found a novel method of selectively oxidizing a diphosphine to diphosphine monoxide using an industrially inexpensive metal catalyst and using water as an oxygen source.

Advantageous Effects of Invention

According to the aspect of non-limiting embodiments of the present disclosure, a diphosphine monoxide can be produced with high selectivity and high yield by allowing a diphosphine to react with water in the presence of a metal catalyst, an oxidizing agent, and a base to selectively oxidize the diphosphine.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

DESCRIPTION OF EMBODIMENTS

Next, the present disclosure will be specifically described.

A method for producing a diphosphine monoxide according to the present disclosure is a method of obtaining a diphosphine monoxide represented by a general formula (2) by allowing a corresponding diphosphine represented by a general formula (1) to react with water in the presence of a metal catalyst, an oxidizing agent, and a base.

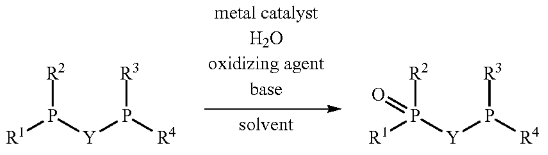

(1) (2)

In the compounds represented by the general formulas (1) and (2), examples of an aryl group optionally having a substituent represented by $R^1$, $R^2$, $R^3$ and $R^4$ include an aryl group having 6 to 14 carbon atoms, and specific examples thereof include a phenyl group, a naphthyl group, an anthryl group, a phenanthryl group, and a biphenyl group. Among them, a phenyl group is preferable. These aryl groups may have a substituent, and examples of the substituent include an alkyl group, an alkoxy group, an aryl group, and a heterocyclic group.

The alkyl group as the substituent of the aryl group may be linear, branched, or cyclic. Examples thereof include an alkyl group having 1 to 15 carbon atoms, preferably 1 to 10 carbon atoms, and more preferably 1 to 6 carbon atoms, and specific examples thereof include a methyl group, an ethyl group, an n-propyl group, an isopropyl group, an n-butyl group, a sec-butyl group, an isobutyl group, and a tert-butyl group.

The alkoxy group as the substituent of the aryl group may be linear, branched, or cyclic. Examples thereof include an alkoxy group having 1 to 6 carbon atoms, and specific examples thereof include a methoxy group, an ethoxy group, an n-propoxy group, an isopropoxy group, an n-butoxy group, a sec-butoxy group, an isobutoxy group, and a tert-butoxy group.

Examples of the aryl group as the substituent of the aryl group include an aryl group having 6 to 14 carbon atoms, carbon atoms, and specific examples thereof include a phenyl group, a naphthyl group, an anthryl group, a phenanthryl group, and a biphenyl group.

The heterocyclic group as the substituent of the aryl group include an aliphatic heterocyclic group and an aromatic heterocyclic group, for example, a 5-membered to 8-membered, preferably 5-membered or 6-membered monocyclic, polycyclic or condensed aliphatic heterocyclic group having 2 to 15 carbon atoms and containing, as a dissimilar atom, at least 1, preferably 1 to 3 heteroatoms such as a nitrogen atom, an oxygen atom, and a sulfur atom. Specific examples of the aliphatic heterocyclic group include a pyrrolidyl-2-one group, a piperidino group, a piperazinyl group, a morpholino group, a tetrahydrofuryl group, a tetrahydropyranyl group, and a tetrahydrothienyl group. Specific examples of the aromatic heterocyclic group include a furyl group, a thienyl group, a pyridyl group, a pyrimidyl group, a pyrazyl group, a pyridazyl group, a pyrazolyl group, an imidazolyl group, an oxazolyl group, a thiazolyl group, a benzofuryl group, a benzothienyl group, a quinolyl group, an isoquinolyl group, a quinoxalyl group, a phthalazyl group, a quinazolyl group, a naphthyridyl group, a cinnolyl group, a benzimidazolyl group, a benzoxazolyl group, and a benzothiazolyl group.

Examples of a heterocyclic group optionally having a substituent represented by $R^1$, $R^2$, $R^3$ and $R^4$ include the aliphatic heterocyclic group and aromatic heterocyclic group described above.

An alkyl group optionally having a substituent represented by $R^1$, $R^2$, $R^3$ and $R^4$ may be linear, branched, or cyclic. Examples thereof include an alkyl group having 1 to 15 carbon atoms, preferably 1 to 10 carbon atoms, and more preferably 1 to 6 carbon atoms, and specific examples thereof include a methyl group, an ethyl group, an n-propyl group, an isopropyl group, an n-butyl group, a sec-butyl group, an isobutyl group, and a tert-butyl group.

In addition, examples of a cycloalkyl group optionally having a substituent represented by $R^1$, $R^2$, $R^3$ and $R^4$ include a 5-membered ring or 6-membered ring cycloalkyl group, and the ring may be substituted with one or two or more of the alkyl groups or alkoxy groups described above. Preferred examples of the cycloalkyl group include a cyclopentyl group and a cyclohexyl group.

Examples of a divalent arylene group represented by Y include a phenylene group, a biphenyldiyl group, and a binaphthalenediyl group. Examples of the phenylene group include an o- or m-phenylene group. The phenylene group may be substituted with: an alkyl group such as a methyl group, an ethyl group, an n-propyl group, an isopropyl group, an n-butyl group, a sec-butyl group, an isobutyl group, and a tert-butyl group; an alkoxy group such as a methoxy group, an ethoxy group, an n-propoxy group, an isopropoxy group, an n-butoxy group, a sec-butoxy group, an isobutoxy group, and a tert-butoxy group; a hydroxy group; an amino group; or a substituted amino group. The biphenyldiyl group and the binaphthalenediyl group preferably have a 1,1'-biaryl-2,2'-diyl type structure. The biphenyldiyl group and the binaphthalenediyl group may be substituted with the alkyl group and the alkoxy group described above, for example, an alkylenedioxy group such as a methylenedioxy group, an ethylenedioxy group, and a trimethylenedioxy group, a hydroxy group, an amino group, or a substituted amino group.

Examples of an alkylene group represented by Y include an alkylene group having 1 to 8 carbon atoms, preferably 2 to 6 carbon atoms. Specific examples of the alkylene group include a methylene group, an ethylene group, a trimethylene group, a tetramethylene group, a pentamethylene group, a hexamethylene group, a heptamethylene group, and an octamethylene group. An ethylene group, a trimethylene group, and a tetramethylene group are preferred.

Specific examples of the compound represented by the general formula (1) include known bisphosphines such as 1,1-bis(diphenylphosphino)methane, 1,2-bis(diphenylphosphino)ethane, 1,3-bis(diphenylphosphino)propane, 1,4-bis(diphenylphosphino)butane, 2,3-bis(diphenylphosphino)butane, 1,1'-bis(diphenylphosphino)ferrocene, 2,2'-bis(diphenylphosphino)-1,1'-binaphthyl, 2,2'-bis(di-para-tolylphosphino)-1,1'-binaphthyl, 2,2'-bis(diphenylphosphino)-5,5',6,6',7,7,8,8'-octahydro-1,1'-binaphthyl, 2,2'-bis(di-3,5-xylylphosphino)-1,1'-binaphthyl, 5,5'-bis(diphenylphosphino)-4,4'-bi-1,3-benzodioxole, 5,5'-bis(di(3,5-xylyl)phosphino)-4,4'-bi-1,3-benzodioxole, 5,5'-bis[di(3,5-di-tert-butyl-4-methoxyphenyl)phosphino]-4,4'-bi-1,3-benzodioxole, 2,2'-bis(diphenylphosphino)-6,6'-dimethoxy-1,1'-biphenyl, 1,2-bis(2,5-dimethylphosphorano)benzene, 1,2-bis(2,5-diethylphosphorano)benzene, 1,2-bis(2,5-diisopropylphosphorano)benzene, and 4,5'-bis(diphenylphosphino)-9,9'-dimethylxanthene. Examples thereof also include an optically active compound represented by the general formula (1) having axial asymmetry.

A reaction solvent in the production method according to the present disclosure is not particularly limited as long as it does not participate in the reaction. Examples thereof include amides such as N,N-dimethylformamide, formamide, and N,N-dimethylacetamide, halogenated hydrocarbons such as dichloromethane, 1,2-dichloroethane, chloroform, carbon tetrachloride, and o-dichlorobenzene, aliphatic hydrocarbons such as pentane, hexane, heptane, octane, decane, and cyclohexane, aromatic hydrocarbons such as benzene, toluene, and xylene, non-nucleophilic alcohols such as tert-butanol, ethers such as diethyl ether, diisopropyl ether, tert-butyl methyl ether, dimethoxyethane, ethylene glycol diethyl ether, tetrahydrofuran, 1,4-dioxane, and 1,3-dioxolane, and sulfoxides such as dimethylsulfoxide. Preferred are N,N-dimethylformamide, N,N-dimethylacetamide, dichloromethane, and dimethylsulfoxide, which are aprotic solvents, and more preferred is N,N-dimethylformamide.

These solvents may be used alone or in combination of two or more thereof. In addition, depending on the case, the reaction can be carried out without a solvent.

Examples of the metal catalyst include platinum, silver, gold, rhodium, ruthenium, osmium, nickel, cobalt, and iron, and a metal salt or complex thereof. These may be used alone or in combination of two or more thereof. Among the above metal salt or complex, a nickel salt and a nickel complex are particularly preferred. Specific examples thereof include nickel (II) chloride, nickel (II) bromide, nickel (II) iodide, nickel (II) nitrate, nickel (II) sulfate, ammonium nickel (II) sulfate, nickel (II) hypophosphite, nickel (II) acetate, nickel (II) formate, nickel (II) stearate, nickel (II) cyclohexane butyrate, nickel (II) citrate, nickel (II) naphthenate, hexaamminenickel (II) chloride, hexaamminenickel (II) iodide, nickel acetylacetonate, nickel (II) hydroxide, bis(η3-allyl) nickel (II), bis(l-cyclopentadienyl) nickel (II), 1,4-diphenylphosphinobutane nickel (II) chloride ($NiCl_2$(dppb)), 1,3-diphenylphosphinopropane nickel (II) chloride ($NiCl_2$(dppp)), 1,2-diphenylphosphinoethane nickel (II) chloride ($NiCl_2$(dppe)), 1,1'-bis(diphenylphosphino)ferrocene nickel (II) chloride, [1,3-bis(2,6-diisopropylphenyl)imidazol-2-ylidene]triphenylphosphine nickel (II) chloride [$NiCl_2$(IPr)($PPh_3$)] (IPr=1,3-bis(2,6-diisopropylphenyl)imidazol-2-ylidene), an allyl nickel chloride dimer, [1,2-bis(dicyclohexylphosphino)ethane]dicarbonyl nickel (0) (Ni(dcype)$(CO)_2$), bis(1,5-cyclooctadiene) nickel (0), and nickel (0) carbonyl.

Preferred examples of the nickel compound include nickel (II) chloride, nickel (II) bromide, nickel (II) iodide, $NiCl_2$(dppb), $NiCl_2$(dppp), $NiCl_2$(dppe), 1,1'-bis(diphenylphosphino)ferrocene nickel (II) chloride, [$NiCl_2$(IPr)($PPh_3$)], and (Ni(dcype)$(CO)_2$). These nickel compounds may be either an anhydride or a hydrate.

Examples of the oxidizing agent include an aromatic halide and an aromatic sulfonic acid ester. The aromatic ring in the aromatic halide may be a single ring or a condensed ring of two or more aromatic rings, is preferably an aromatic hydrocarbon ring, more preferably a benzene ring, a naphthalene ring, or an anthracene ring. Examples of the halogen atom in the aromatic halides include a fluorine atom, a chlorine atom, a bromine atom, and an iodine atom. In addition, the aromatic halide may have a substituent other than the halogen atom on the aromatic ring. Preferred examples of the substituent include an optionally branched alkyl group having 1 to 12 carbon atoms. If possible, the substituent may be further substituted and may have a ring structure.

Specific examples of the aromatic halide include fluorobenzene, chlorobenzene, bromobenzene, iodobenzene, 1,2-difluorobenzene, 1-chloro-2-fluorobenzene, 1,2-dichlorobenzene, 1-bromo-2-fluorobenzene, 1-bromo-2-chlorobenzene, 1,2-dibromobenzene, 1-bromo-2-iodobenzene, 1-fluoro-2-iodobenzene, 1-chloro-2-iodobenzene, 1,2-diiodobenzene, 2-fluorotoluene, 2-chlorotoluene, 2-bromotoluene, 2-iodotoluene, 1-bromo-2-ethylbenzene, 1,3-dibromobenzene, 1,3-difluorobenzene, 1,3-dichlorobenzene, 1,3-diiodobenzene, 1-chloro-3-fluorobenzene, 1-bromo-3-fluorobenzene, 3-bromo-1-chlorobenzene, 1-fluoro-3-iodobenzene, 1-chloro-3-iodobenzene, 1-bromo-3-iodobenzene, 3-fluorotoluene, 3-bromotoluene, 3-iodotoluene, 1,4-diiodobenzene, 1,4-dichlorobenzene, 1,4-fluorobenzene, 1,4-dibromobenzene, 1-chloro-4-iodobenzene, 1-chloro-4-fluorobenzene, 1-bromo-4-fluorobenzene, 4-bromo-1-chlorobenzene, 1-fluoro-4-iodobenzene, 1-chloro-4-iodobenzene, 1-bromo-4-iodobenzene, 4-fluorotoluene, 4-chlorotoluene, 4-bromotoluene, 4-iodotoluene, 1-bromo-4-ethylbenzene, 1-bromo-4-propylbenzene, 1-bromo-4-butylbenzene, 1,2,3-trifluorobenzene, 1,2,3-trichlorobenzene, 1,2,3-tribromobenzene, 1,2,3-triiodobenzene, 1-bromo-2,6-dichlorobenzene, 1-bromo-2,3-dichlorobenzene, 2,2-dichloro-3-iodobenzene, 2-bromo-m-xylene, 3-bromo-o-xylene, 2,6-difluorotoluene, 2,4-difluorotoluene, 2,5-difluorotoluene, 3,4-difluorotoluene, 2-chloro-4-fluorotoluene, 3-chloro-4-fluorotoluene, 4-chloro-2-fluorotoluene, 2,6-difluorotoluene, 3,4-difluorotoluene, 2-chloro-4-fluorotoluene, 3-chloro-4-fluorotoluene, 4-chloro-2-fluorotoluene, 5-chloro-2-fluorotoluene, 2-chloro-6-fluorotoluene, 4-bromo-3-fluorotoluene, 3-bromo-4-fluorotoluene, 2-bromo-4-fluorotoluene, 1,2,4-trifluorobenzene, 1-chloro-2,4-difluorobenzene, 2-chloro-p-xylene, 4-iodo-o-xylene, 4-chloro-o-xylene, 2,5-dichlorotoluene, 3,4-dichlorotoluene, 1,2,4-trichlorobenzene, 1,2,4-tribromobenzene, 4-bromo-o-xylene, 1,3,5-trichlorobenzene, 1,3,5-trifluorobenzene, 1,3,5-tribromobenzene, pentafluorobenzene, 3,5-bis(trifluoromethyl)iodobenzene, 1-fluoronaphthalene, 1-chloronaphthalene, 1-bromonaphthalene, 1-iodonaphthalene, 2-fluoronaphthalene, 2-chloronaphthalene, 9-chloroanthracene, and 8-bromoanthracene.

Preferred examples of the aromatic halide include bromobenzene, iodobenzene, 2-bromotoluene, 2-iodotoluene, 3-bromotoluene, 3-iodotoluene, 4-bromotoluene, 4-iodotoluene, 1,2,3-tribromobenzene, 1,2,3-triiodobenzene, and 3,5-bis(trifluoromethyl)iodobenzene, and more preferred examples thereof include iodobenzene, 2-iodotoluene, 3-iodotoluene, and 4-iodotoluene.

The aromatic halide may be used alone or in combination of two or more thereof.

Examples of the aromatic sulfonic acid ester include phenyl methanesulfonate, phenyl 4-methylbenzenesulfonate, phenyl trifluoromethanesulfonate, p-tolyl methanesulfonate, p-tolyl 4-methylbenzenesulfonate, p-tolyl trifluoromethanesulfonate, o-tolyl methanesulfonate, o-tolyl 4-methylbenzenesulfonate, o-tolyl trifluoromethanesulfonate, m-tolyl methanesulfonate, m-tolyl 4-methylbenzenesulfonate, m-tolyl trifluoromethanesulfonate, 2-methoxyphenyl methanesulfonate, 2-methoxyphenyl 4-methylbenzenesulfonate, 2-methoxyphenyl trifluoromethanesulfonate, 2-chlorophenyl methanesulfonate, 2-chlorophenyl 4-methylbenzenesulfonate, 2-chlorophenyl trifluoromethanesulfonate, 2-bromophenyl methanesulfonate, 2-bromophenyl 4-methylbenzenesulfonate, 2-bromophenyl trifluoromethanesulfonate, 2-iodophenyl methanesulfonate, 2-iodophenyl 4-methylbenzenesulfonate, 2-iodophenyl trifluoromethanesulfonate, 2-bromophenyl methanesulfonate, pentafluorophenyl methanesulfonate, pentafluorophenyl 4-methylbenzenesulfonate, pentafluorophenyl trifluoromethanesulfonate, 4-acetoxyphenyl methanesulfonate, 4-acetoxyphenyl 4-methylbenzenesulfonate, 4-acetoxyphenyl trifluoromethanesulfonate, 4-nitrophenyl methanesulfonate, 4-nitrophenyl 4-methylbenzenesulfonate, 4-nitrophenyl trifluoromethanesulfonate, 3-nitrophenyl methanesulfonate, 3-nitrophenyl 4-methylbenzenesulfonate, 3-nitrophenyl trifluoromethanesulfonate, 2-naphthyl methanesulfonate, 2-naphthyl 4-methylbenzenesulfonate, 2-naphthyl trifluoromethanesulfonate, 2-trimethylsilylphenyl methanesulfonate, 2-trimethylsilylphenyl 4-methylbenzenesulfonate, 2-trimethylsilylphenyl trifluoromethanesulfonate, 4-biphenyl methanesulfonate, 4-biphenyl 4-methylbenzenesulfonate, 4-biphenyl trifluoromethanesulfonate, catechol bismethanesulfonate, catechol bis-4-methylbenzenesulfonate, catechol bistrifluoromethanesulfonate, 1,4-naphthalene bismethanesulfonate, 1,4-naphthalene bis-4-methylbenzenesulfonate, 1,4-naphthalene bistrifluoromethanesulfonate, 2,7-naphthalene bismethanesulfonate, 2,7-naphthalene bis-4-methylbenzenesulfonate, 2,7-naphthalene bistrifluoromethanesulfonate, 1,1'-binaphthyl-2,2'-diyl bismethanesulfonate, 1,1'-binaphthyl-2,2'-diyl bis-4-methylbenzenesulfonate, and 1,1'-binaphthyl-2,2'-diyl bistrifluoromethanesulfonate.

Preferred examples include phenyl trifluoromethanesulfonate, p-tolyl trifluoromethanesulfonate, o-tolyl trifluoromethanesulfonate, m-tolyl trifluoromethanesulfonate, and 1,1'-binaphthyl-2,2'-diyl bistrifluoromethanesulfonate.

The aromatic sulfonic acid esters may be used alone or in combination of two or more thereof.

Examples of the base include tri-n-propylamine, tri-n-butylamine, tri-n-pentylamine, tri-n-hexylamine, tri-n-heptylamine, tri-n-octylamine, tri-n-nonylamine, tri-n-decylamine, tri-n-undecylamine, tri-n-dodecylamine, tri-n-tridecylamine, tri-n-tetradecylamine, tri-n-pentadecylamine, tri-n-hexadecylamine, tri(2-ethylhexyl)amine, dimethyldecylamine, dimethyldodecylamine, dimethyltetradecylamine, ethyldi(2-propyl)amine, dioctylmethylamine, dihexylmethylamine, tricyclopentylamine, tricyclohexylamine, tricycloheptylamine, tricyclooctylamine, dimethylcyclohexylamine, methyldicyclohexylamine, diethylcyclohexylamine, ethyldicyclohexylamine, dimethylcyclopentylamine, methyldicyclopentylamine, triphenylamine, methyldiphenylamine, ethyldiphenylamine, propyldiphenylamine, butyldiphenylamine, 2-ethylhexyldiphenylamine, dimethylphenylamine, diethylphenylamine, dipropylphenylamine, dibutylphenylamine, bis-(2-ethylhexyl)phenylamine, tribenzylamine, methyldibenzylamine, ethyldibenzylamine, 1,8-diazabicyclo[5.4.0]undec-7-ene (DBU), 1,4-diazabicyclo[2.2.2]octane (DABCO), N-methyl-8-azabicyclo[3.2.1]octane (tropane), N-methyl-9-azabicyclo[3.3.1]nonane (granatane), and 1-azabicyclo[2.2.2]octane (quinuclidine).

Preferred examples include 1,8-diazabicyclo[5.4.0]undec-7-ene (DBU), 1,4-diazabicyclo[2.2.2]octane (DABCO), N-methyl-8-azabicyclo[3.2.1]octane (tropane), N-methyl-9-azabicyclo[3.3.1]nonane (granatane), and 1-azabicyclo[2.2.2]octane (quinuclidine), and more preferred examples include 1,4-diazabicyclo[2.2.2]octane (DABCO).

These bases may be used alone or in combination of two or more thereof.

The reaction can be carried out using the metal catalyst in an amount in a range of usually about 0.1 mol % to 20.0 mol %, and preferably 1.0 mol % to 10.0 mol %, with respect to the diphosphine.

The reaction can be carried out using the oxidizing agent in an amount in a range of usually 0.5 equivalents to 10.0 equivalents, and preferably 1.0 equivalent to 2.0 equivalents, with respect to the diphosphine.

The reaction can be carried out using the base in an amount in a range of usually 1.0 equivalent to 20.0 equivalents, and preferably 3.0 equivalents to 10.0 equivalents, with respect to the diphosphine.

The reaction can be carried out using the water in an amount in a range of usually 1.0 equivalent to 20.0 equivalents, and preferably 3.0 equivalents to 10.0 equivalents, with respect to the diphosphine. In addition, moisture contained in the solvent, the base, the oxidizing agent, and the catalyst to be used can also be used in the reaction.

The reaction can be carried out in a reaction temperature in a range of usually 80° C. to 200° C., preferably 80° C. to 160° C., and more preferably 100° C. to 160° C.

The reaction time is usually 30 minutes to 48 hours, and preferably 1 hour to 24 hours.

This reaction is preferably carried out in an inert gas such as nitrogen or argon.

After completion of the reaction, the target compound represented by the general formula (2) can be obtained by carrying out post-treatment operations commonly used in this field, such as filtration and silica gel column chromatography, and by performing purification methods such as crystallization, distillation, and various chromatographic methods alone or in an appropriate combination.

EXAMPLES

Hereinafter, the present disclosure will be described in more detail with reference to Examples, but the present disclosure is not limited to these Examples. The measuring equipment used in Examples is as follows.

Phosphorus 31 nuclear magnetic resonance spectroscopy ($^{31}$P NMR): 400 MR/DD2 (resonance frequency: 161 MHz, manufactured by Agilent)

External standard substance: phosphoric acid in heavy water (0 ppm (singlet peak))

Example 1 Synthesis of (R)-2-diphenylphosphinyl-2'-diphenylphosphino-1,1'-binaphthyl To a reaction vessel were added (R)-2,2'-bis(diphenylphosphino)-1,1'-binaphthyl (311 mg, 0.500 mmol) and 1,4-diazabicyclo[2.2.2]octane (337 mg, 3.00 mmol), followed by replacement of internal atmosphere by nitrogen, and then a N,N-dimethylformamide solution (3.1 mL) of water (45.1 mg, 2.50 mmol) and nickel (II) chloride hexahydrate (5.9 mg, 0.025 mmol), and iodobenzene (102 mg, 0.500 mmol) were added. The mixture was stirred at 140° C. for 6 hours under a nitrogen atmosphere, followed by cooling and addition with methanol (6.2 mL) and water (3.1 mL) at room temperature, the precipitation was filtered at 0° C., and the cake was washed with water (1.6 mL). The obtained solid was dried under a reduced pressure to give 217 mg of a title compound (yield: 68%). $^{31}$P NMR (161 MHz, $CDCl_3$) δ: −15.3 (s, 1P), 27.7 (s, 1P)

Comparative Example 1

An attempt was made to produce (R)-2-diphenylphosphinyl-2'-diphenylphosphino-1,1'-binaphthyl from (R)-2,2'-bis(diphenylphosphino)-1,1'-binaphthyl according to a method described in U.S. Pat. No. 5,919,984 A (Patent Literature 4) with changing palladium acetate, i.e., a catalyst used in Patent Literature 4, to nickel acetate tetrahydrate.

To a reaction vessel was added nickel acetate tetrahydrate (8.8 mg, 0.036 mmol), followed by replacement of internal atmosphere by nitrogen, and then (R)-2,2'-bis(diphenylphosphino)-1,1'-binaphthyl (623 mg, 1.00 mmol), dichloromethane (3.9 mL), and 1,2-dibromoethane (772 mg, 4.11 mmol) were added. The mixture was stirred at 30° C. for 30 minutes under a nitrogen atmosphere, and 1.2 mL of a 4.5% aqueous sodium hydroxide solution was added. The mixture was stirred at 30° C. for 4 hours under a nitrogen atmosphere and the reaction solution was analyzed by $^{31}$P NMR. However, (R)-2-diphenylphosphinyl-2'-diphenylphosphino-1,1'-binaphthyl was not generated at all, and only the raw material (R)-2,2'-bis(diphenylphosphino)-1,1'-binaphthyl was observed.

Example 2 Synthesis of (S)-2-di[(3,5-xylyl)phosphinyl]-2'-di[(3,5-xylyl)phosphino]-1,1'-binaphthyl To a reaction vessel were added (S)-(−)-2,2'-bis[di(3,5-xylyl)phosphino]-1,1'-binaphthyl (368 mg, 0.500 mmol) and 1,4-diazabicyclo[2.2.2]octane (337 mg, 3.00 mmol), followed by replacement of internal atmosphere by nitrogen, and then a N,N-dimethylformamide solution (3.1 mL) of water (45.1 mg, 2.50 mmol) and nickel (II) chloride hexahydrate (5.9 mg, 0.025 mmol), and iodobenzene (154 mg, 0.750 mmol) were added. The mixture was stirred at 140° C. for 12 hours under a nitrogen atmosphere, followed by cooling and addition with water (3.1 mL) and methanol (3.1 mL) at room temperature, the precipitation was filtered at 0° C., and the cake was washed with water (3.1 mL). The obtained solid was dried under a reduced pressure to give 329 mg of a title compound (yield: 88%). $^{31}$P NMR (161 MHz, $CDCl_3$) δ: −15.2 (s, 1P), 30.4 (s, 1P).

Example 3 Synthesis of (R)-2-diphenylphosphinyl-2'-diphenylphosphino-5,5',6,6',7,7',8,8'-octahydro-1,1'-binaphthyl To a reaction vessel were added (R)-2,2'-bis(diphenylphosphino)-5,5',6,6',7,7',8,8'-octahydro-1,1'-binaphthyl (315 mg, 0.500 mmol) and 1,4-diazabicyclo[2.2.2]octane (337 mg, 3.00 mmol), followed by replacement of internal atmosphere by nitrogen, and then a N,N-dimethylformamide solution (3.1 mL) of water (45.1 mg, 2.50 mmol) and nickel (II) chloride hexahydrate (11.9 mg, 0.050 mmol), and iodobenzene (154 mg, 0.750 mmol) were added. The mixture was stirred at 140° C. for 12 hours under a nitrogen atmosphere, followed by cooling and addition with water (3.1 mL) and methanol (6.2 mL) at room temperature, the precipitation was filtered at 0° C., and the cake was washed with water (3.1 mL). The obtained solid was dried under a reduced pressure to give 262 mg of a title compound (yield: 81%). $^{31}$P NMR (161 MHz, $CDCl_3$) δ: −17.2 (s, 1P), 28.2 (s, 1P).

Example 4 Synthesis of (S)-2-diphenylphosphinyl-2'-diphenylphosphino-6,6'-dimethoxy-1,1'-biphenyl To a reaction vessel were added (S)-(−)-2,2'-bis(diphenylphosphino)-6,6'-dimethoxy-1,1'-biphenyl (146 mg, 0.250 mmol) and 1,4-diazabicyclo[2.2.2]octane (168 mg, 1.50 mmol), followed by replacement of internal atmosphere by nitrogen, and then a N,N-dimethylformamide solution (1.6 mL) of water (22.5 mg, 1.25 mmol) and nickel (II) chloride hexahydrate (3.0 mg, 0.013 mmol), and iodobenzene (76.5 mg, 0.375 mmol) were added. The mixture was stirred at 140° C. for 6 hours under a nitrogen atmosphere, followed by cooling and addition with water (4.4 mL) and methanol (3.1 mL) at room temperature, the precipitation was filtered at 0° C., and the cake was washed with water (1.6 mL). The obtained solid was dried under a reduced pressure to give 115 mg of a title compound (yield: 77%). $^{31}$P NMR (161 MHz, $CDCl_3$) δ: −15.4 (s, 1P), 27.5 (s, 1P).

Example 5

The reaction was carried out in the same manner as in Example 1, except that the solvent used was changed to N,N-dimethylacetamide, and the reaction solution was analyzed by $^{31}$P NMR 6 hours after the start of reaction. As a result, the integral rate of the raw material (R)-2,2'-bis(diphenylphosphino)-1,1'-binaphthyl was 3.2%, and that of the target product (R)-2-diphenylphosphinyl-2'-diphenylphosphino-1,1'-binaphthyl was 96.8%.

Examples 6 to 9

The reaction was carried out in the same manner as in Example 1, except that the nickel catalyst used was changed. Table 1 shows the results.

TABLE 1

| Example | Ni catalyst | Reaction time (hrs) | $^{31}$P NMR integral rate substrate | monoxide |
|---|---|---|---|---|
| 6 | $NiCl_2$(dppe) | 4 | 3.8% | 96.3% |
| 7 | Ni(dcype)$(CO)_2$ | 4 | 41.4% | 58.6% |
| 8 | $NiCl_2(PPh_3)$IPr | 2 | 49.7% | 48.1% |
| 9 | $NiI_2$ | 2 | 43.9% | 54.8% |

Examples 10 to 13

The reaction was carried out in the same manner as in Example 1, except that the oxidizing agent used was changed. Table 2 shows the results.

TABLE 2

| Example | Oxidizing agent | Reaction time (hrs) | $^{31}$P NMR integral rate substrate | monoxide |
|---|---|---|---|---|
| 10 | 3,5-bis(trifluoro-methyl)iodobenzene | 4 | 8.1% | 91.9% |
| 11 | 4-iodotoluene | 6 | 0% | 100% |
| 12 | 2-iodotoluene | 6 | 10.3% | 89.7% |
| 13 | Phenyl triflate | 4 | 79.9% | 20.1% |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

The present disclosure includes the following aspects.

<1> A method for producing a diphosphine monoxide represented by a general formula (2), the method including:

allowing a diphosphine represented by a general formula (1) to react with water in the presence of a metal catalyst, an oxidizing agent, and a base to selectively oxidize the diphosphine, (1)

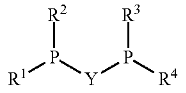

(2)

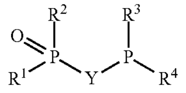

in which in the general formula (1) and the general formula (2), $R^1$, $R^2$, $R^3$ and $R^4$ each independently represent an aryl group optionally having a substituent, a heterocyclic group optionally having a substituent, an alkyl group optionally having a substituent, or a cycloalkyl group optionally having a substituent, and Y represents an alkylene group optionally having a substituent or a divalent arylene group optionally having a substituent.

<2> The method for producing a diphosphine monoxide according to <1>, in which the metal catalyst is a nickel catalyst.

<3> The method for producing a diphosphine monoxide according to <1> or <2>, in which in the general formula (1), $R^1$, $R^2$, $R^3$ and $R^4$ are each independently an aryl group optionally having a substituent, and Y is a divalent arylene group optionally having a substituent.

<4> The method for producing a diphosphine monoxide according to any one of <1> to <3>, in which an aprotic solvent is used as a reaction solvent.

<5> The method for producing a diphosphine monoxide according to any one of <1> to <4>, in which the oxidizing agent is an aromatic halide or an aromatic sulfonic ester.

<6> The method for producing a diphosphine monoxide according to any one of <1> to <5>, in which the base is 1,4-diazabicyclo[2.2.2]octane.

<7> The method for producing a diphosphine monoxide according to any one of <1> to <6>, in which a reaction temperature is 80° C. to 200° C.

<8> The method for producing a diphosphine monoxide according to any one of <1> to <7>, in which an amount of the metal catalyst is 0.1 mol % to 20.0 mol % with respect to the diphosphine represented by the general formula (1).

What is claimed is:

1. A method for producing a diphosphine monoxide represented by a general formula (2), the method comprising:

allowing a diphosphine represented by a general formula (1) to react with water in the presence of a metal catalyst, an oxidizing agent, and a base to selectively oxidize the diphosphine, (1)

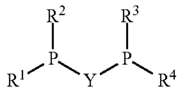

(2)

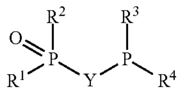

wherein in the general formula (1) and the general formula (2), $R^1$, $R^2$, $R^3$ and $R^4$ each independently represent an aryl group optionally having a substituent, a heterocyclic group optionally having a substituent, an alkyl group optionally having a substituent, or a cycloalkyl group optionally having a substituent, and Y represents an alkylene group optionally having a substituent or a divalent arylene group optionally having a substituent, and wherein the oxidizing agent is an aromatic halide or an aromatic sulfonic acid ester.

2. The method for producing a diphosphine monoxide according to claim 1, wherein the metal catalyst is a nickel catalyst.

3. The method for producing a diphosphine monoxide according to claim 1, wherein in the general formula (1), $R^1$, $R^2$, $R^3$ and $R^4$ are each independently an aryl group optionally having a substituent, and Y is a divalent arylene group optionally having a substituent.

4. The method for producing a diphosphine monoxide according to claim 1, wherein an aprotic solvent is used as a reaction solvent.

5. The method for producing a diphosphine monoxide according to claim 1, wherein the base is 1,4-diazabicyclo[2.2.2]octane.

6. The method for producing a diphosphine monoxide according to claim 1, wherein a reaction temperature is 80° C. to 200° C.

7. The method for producing a diphosphine monoxide according to claim 1, wherein an amount of the metal catalyst is 0.1 mol % to 20.0 mol % with respect to the diphosphine represented by the general formula (1).

8. A method for producing a diphosphine monoxide represented by a general formula (2), the method comprising:

allowing a diphosphine represented by a general formula (1) to react with water in the presence of a metal catalyst, an oxidizing agent, and a base to selectively oxidize the diphosphine, (1)

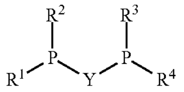

(2)

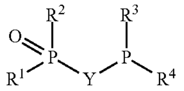

wherein in the general formula (1) and the general formula (2), $R^1$, $R^2$, $R^3$ and $R^4$ each independently represent an aryl group optionally having a substituent, a heterocyclic group optionally having a substituent, an alkyl group optionally having a substituent, or a cycloalkyl group optionally having a substituent, and Y represents an alkylene group optionally having a substituent or a divalent arylene group optionally having a substituent, and wherein the base is 1,4-diazabicyclo[2.2.2]octane.

9. The method for producing a diphosphine monoxide according to claim 8, wherein the metal catalyst is a nickel catalyst.

10. The method for producing a diphosphine monoxide according to claim 8, wherein in the general formula (1), $R^1$, $R^2$, $R^3$ and $R^4$ are each independently an aryl group optionally having a substituent, and Y is a divalent arylene group optionally having a substituent.

11. The method for producing a diphosphine monoxide according to claim 8, wherein an aprotic solvent is used as a reaction solvent.

12. The method for producing a diphosphine monoxide according to claim 8, wherein a reaction temperature is 80° C. to 200° C.

13. The method for producing a diphosphine monoxide according to claim 8, wherein an amount of the metal catalyst is 0.1 mol % to 20.0 mol % with respect to the diphosphine represented by the general formula (1).

* * * * *